Figure 1:
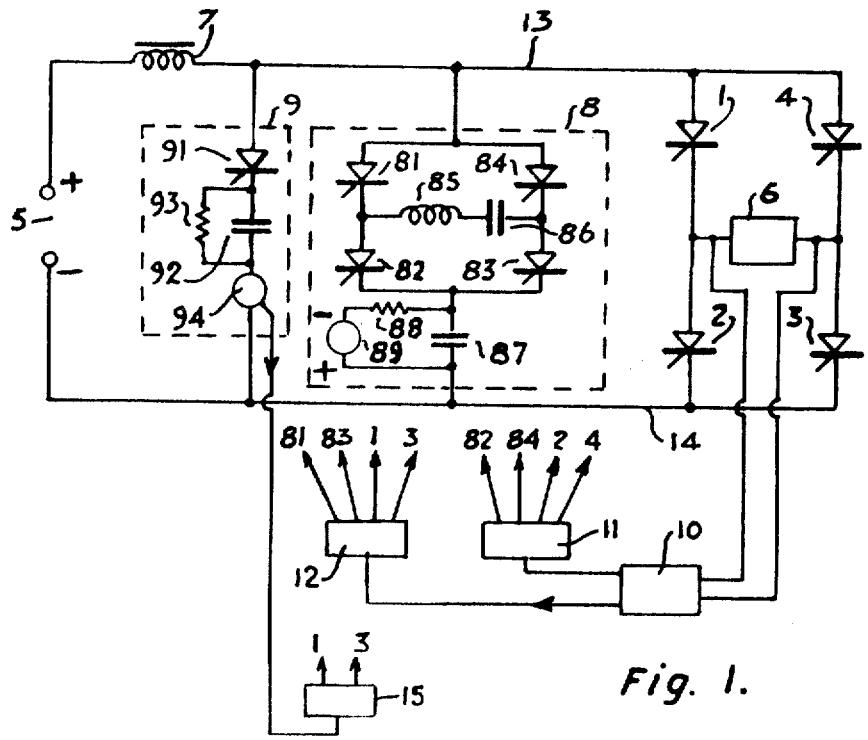
Figure 2:
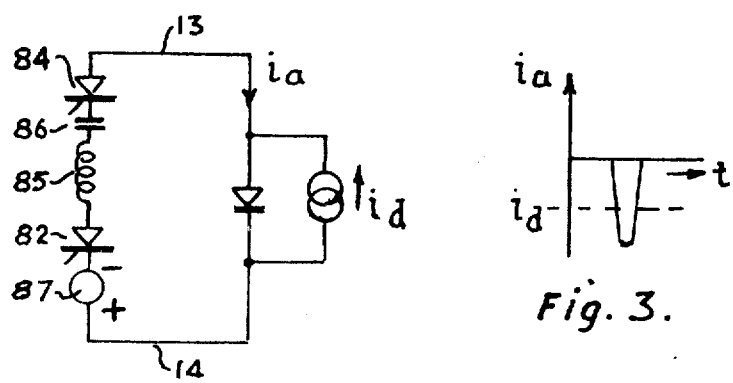
Figure 3:
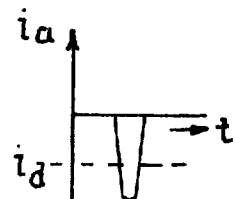

United States Patent

Eastop

[15] 3,657,634

[45] Apr. 18, 1972

[54] INVERTER CIRCUIT

[72] Inventor: Robert Henry Eastop, London, England

[73] Assignee: Westinghouse Brake and Signal Company Limited, London, England

[22] Filed: Nov. 3, 1970

[21] Appl. No.: 86,538

[30] Foreign Application Priority Data

Nov. 26, 1969 Great Britain......................57,921/69
July 17, 1970 Great Britain......................34,880/70

[52] U.S. Cl..........................321/45 S, 219/10.77, 321/45 C, 331/113 S
[51] Int. Cl. ............................................H02m 7/52
[58] Field of Search..............321/45, 45 C, 45 S; 219/10.75, 219/10.77; 331/113 S

[56] References Cited

UNITED STATES PATENTS

| | | | |
|---|---|---|---|
| 3,599,078 | 5/1970 | Pelly | 321/45 S |
| 3,219,905 | 11/1965 | Davis et al | 321/45 C |
| 3,500,170 | 3/1970 | Charrin et al | 321/45 C |
| 3,474,322 | 10/1969 | King | 321/45 |
| 3,506,907 | 4/1970 | Porterfield et al | 321/45 C |

Primary Examiner—William H. Beha, Jr.
Attorney—Larson, Taylor & Hinds

[57] ABSTRACT

In an inverter circuit including first and second pairs of main controllable rectifier devices connected in a bridge configuration between d.c. supply terminals and a resonant load connected across the bridge, an auxiliary commutation circuit is provided for diverting current, over a number of cycles following starting of the inverter, from the controllable rectifier devices at the instant a controllable rectifier device is to be commutated into the non-conducting condition thereof so as to assist in said commutation. An additional circuit is provided for "shocking" the load circuit into resonance during start-up. The load circuit provides natural commutation of the pairs of controllable rectifier devices during normal operation and, during starting, triggering pulses are applied to the incoming controllable rectifier devices sufficiently before the voltage zero of the natural resonant load circuit frequency to ensure adequate build-up of current in these incoming devices.

15 Claims, 5 Drawing Figures point 14. At full power this negative swing if it exceeds the steady potential of source 16 will draw current pulses through the diode 17 whether or not the auxiliary circuit as a whole is operating. Since source 16 will, like source 87, normally comprise a transformer/rectifier source followed by a reservoir capacitor, this capacitor may charge to the peak negative voltage so that the full peak-to-peak value of the voltage on the d.c. lines 13 and 14 appears across the diode 17. The addition of the optional diode 15 as referred to above blocks these current pulses and shares with the diode 17 the voltage excursions between the lines 13 and 14.

Figure 5:
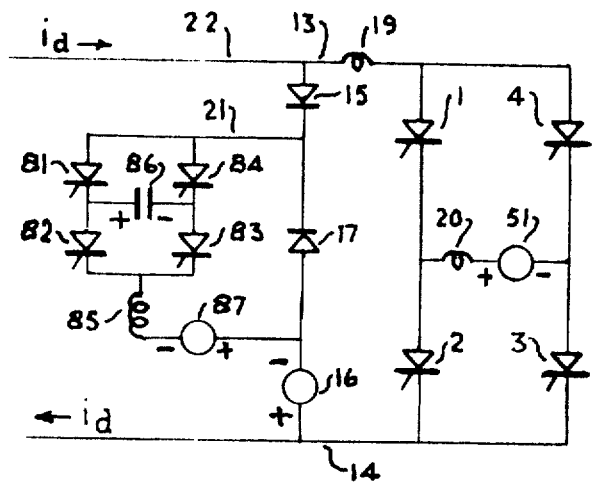

The combination of natural and forced commutation may now be considered. In natural commutation, the effective source 51 of the equivalent circuit of FIG. 5 acts simultaneously in two parallel paths through the arms 1, 4 and 2, 3 of the main inverter and simultaneously in the first place reduces current in 1, 3 to zero and in the second place builds up current in 2, 4 up to the load current level. It may be appreciated from FIG. 5 that the effect of the auxiliary circuit (which is basically a switch 17 in series with the source 16) is to assist the first but to oppose the second action.

As far as extinction of the outgoing controllable rectifier devices of the main inverter are concerned, the source 16 is added (during commutation) to any load voltage which may be available (albeit inadequate by itself) for commutation.

Build up of current in the incoming controllable rectifier devices of the main inverter is generally delayed or reduced however by the auxiliary circuit. During the starting, the build-up of current in the incoming controllable rectifier devices cannot commence until the end of the recovery period of the outgoing controllable rectifier devices and is necessary therefore to ensure that there is adequate voltage swing in the auxiliary circuit to build up at least latch current level in the incoming controllable rectifier devices.

Figure 4:
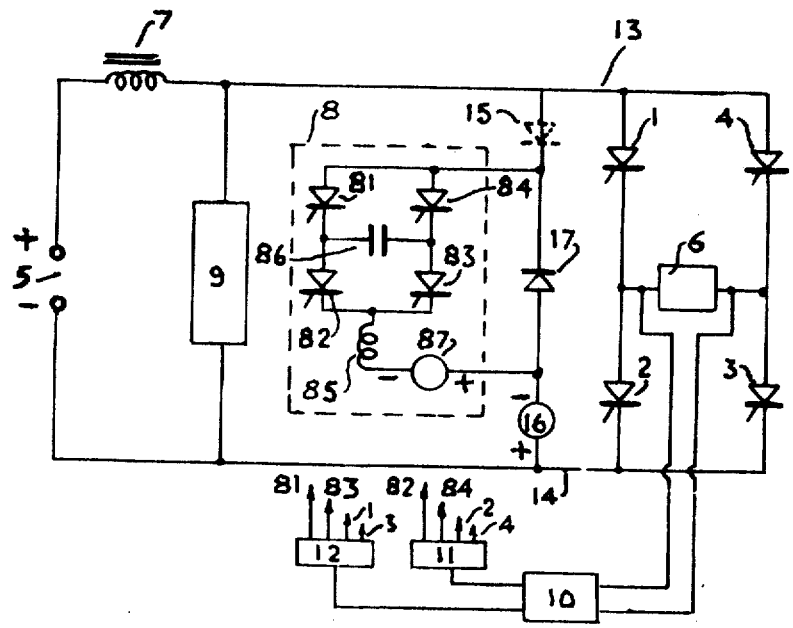

It may be appreciated now that the precise behaviour of the circuit arrangement of FIG. 4 can vary at different levels of direct current $i_d$ in the choke 7 and different levels of medium frequency voltage across the load 6. For example, the incoming controllable rectifier devices of the main inverter may or may not conduct immediately after the conduction period of the diode 17. Again, the conducting thyristors in the auxiliary circuit 8 may or may not be extinguished at the moment when the incoming controllable rectifier devices of the main inverter take up the conducting state. It is a practical advantage of the arrangement of FIG. 4 that such variations as indicated can be tolerated and not cause non-function of the auxiliary circuit or of the main inverter.

When the load voltage has built up to a point where natural commutation is adequate, further action of the auxiliary circuit may if desired be inhibited without disturbance in the main circuit. The moment for inhibiting the operation of the auxiliary circuit does not require to be precisely selected although component ratings may dictate that a different instant be chosen for different modes of operation of the circuit in a practical application.

Typically, means for inhibiting operation of the Auxiliary circuit when a predetermined level of operation in the load has been attained may comprise a load voltage sensing circuit and circuit means responsive thereto for suppressing or blocking output pulses on the lines marked 81, 83 of block 12 and lines 82, 84 of block 11 in FIG. 4.

In the foregoing, reference has been made to several blocks the contents of which have not been described in detail for the interests of simplicity. Principally, these are blocks 10, 11 and 12 and 15.

Block 10 consists of a circuit which accepts as an input waveform the almost sinusoidal voltage across the load 6 and, by operation on a characteristic feature of this waveform, produces in one output circuit a pulse just before the end of each positive half-cycle and in another output circuit a pulse just before the end of each negative half-cycle. Co-pending U.S. Patent application Ser. No. 10,182 describes a particular form of circuit which is suitable for this purpose.

Block 11 and block 12 each consist of any known form of pulse amplifier, or triggered pulse generator, which will produce simultaneously in each isolated output circuit, at a moment determined by the pulse in one or the other output circuit of block 10, a pulse of adequate amplitude and duration to fire the associated devices (82, 84, 2, 4) and (81, 83, 1, 3) respectively.

Block 15 consists of any known form of level detector which will produce a trigger pulse, or a change of state, when the current in the sensing element 94 reaches a pre-determined level and a triggered pulse generator, which will produce simultaneously in each isolated output circuit, at a moment determined by the said trigger pulse, a pulse adequate to fire the pair of associated devices (1,3).

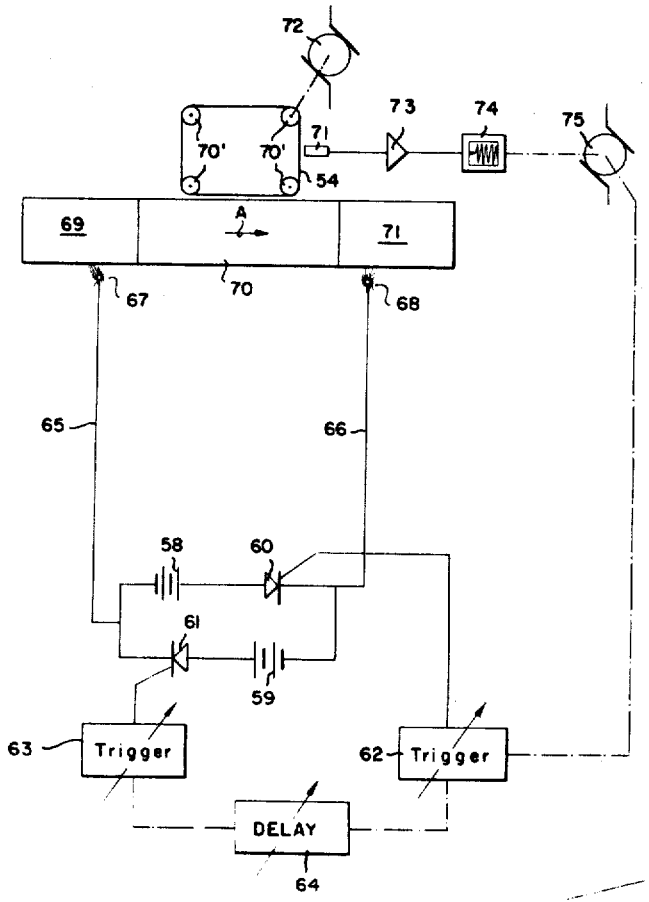

Having thus described our invention what we claim is:

1. In an inverter circuit including first and second main controllable rectifier means connected between d.c. supply terminals and load terminals for connection to a load circuit, said first and second controllable rectifier means operating to conduct alternately so as to supply current in opposite directions through the load terminals and initiation of conduction of either of said controllable rectifier means being effective, in operation, to cause commutation of the other of said controllable rectifier means into the non-conducting condition, the improvement comprising additional circuit means for initiating resonance in the load circuit and an auxiliary commutation circuit for diverting current, over a number of cycles following starting of the inverter, from the controllable rectifier means at the instant a said controllable rectifier means is to be commutated into the non-conducting condition so as to assist in said commutation, said auxiliary commutation circuit including capacitive and inductive components connected in a resonant L-C circuit, the said inductive component not carrying load current.

2. An inverter circuit as claimed in claim 1 wherein said load circuit provides natural commutation of said first and second controllable rectifier means during normal operation and wherein, during starting, triggering pulses are applied to the incoming controllable rectifier means sufficiently before the voltage zero of the natural resonant load circuit frequency to ensure adequate build-up of current in said incoming controllable rectifier means.

3. An inverter circuit as claimed in claim 1, the auxiliary commutation circuit including a source of voltage switchable at said instant into said path.

4. An inverter circuit as claimed in claim 3, the source of voltage being switchable into said path via further controllable semiconductor means.

5. An inverter circuit as claimed in claim 4 wherein said path includes said inductive and capacitive components, said components including an inductance and a first capacitance, the further controllable rectifier means being such as to alternately connect said capacitance in opposite senses into said path with respect to the d.c. lines of the inverter.

6. An inverter circuit as claimed in claim 5, said source of voltage comprising a second capacitance and charging means for charging said capacitance.

7. An inverter circuit as claimed in claim 6 the charging means and the values of said first and second capacitances being so chosen as to enable progressive charging of the second capacitor towards a value opposite to that afforded by the charging means such that the inverter circuit tends to revert to natural commutation by virtue of the output voltage following a number of cycles after starting.

8. An inverter circuit as claimed in claim 2 further comprising a diode for, when conducting, causing switching of said source of voltage, and generating means for generating a current pulse in said diode at said instant.

9. An inverter circuit as claimed in claim 8, said diode being connected across the d.c. lines of said inverter via a further oppositely poled diode.

10. An inverter as claimed in claim 8, the generating means including an inductance and capacitance and further switching means for producing a unidirectional current pulse in the diode.

11. An inverter circuit as claimed in claim 10, the further switching means comprising controllable semiconductor rectifiers in a bridge configuration, a capacitance connected in the "a.c." path of the bridge configuration, an inductance and a further source, and means for rendering the controllable semiconductor rectifier means conducting selectively to alternately transmit current via the L-C. circuit provided by the capacitance and inductance in alternate directions through the capacitance.

12. An inverter circuit as claimed in claim 1, the first and second controllable rectifier means being arranged in a bridge circuit configuration.

13. An inverter circuit as claimed in claim 1 wherein said additional circuit means is connected across the d.c. lines of the inverter and operable prior to starting of the inverter to establish a predetermined current from a d.c. supply.

14. An inverter circuit as claimed in claim 13, the additional circuit means including a semiconductor controllable rectifier, a capacitance and a current sensing device connected in series.

15. An inverter circuit as claimed in claim 14, further comprising means for initiating triggering of the main controllable rectifier means on starting in response to a predetermined current being sensed by said sensing means.

* * * * *

United States Patent

Höller et al.

[15] 3,657,638
[45] Apr. 18, 1972

[54] METHOD OF MAGNETIC FLAW DETECTION IN BODIES OF NONCIRCULAR CROSS SECTION USING UNIDIRECTIONAL MAGNETIZATION AND DEMAGNETIZATION PULSES TO ELIMINATE EDGE DISTORTION OF THE MAGNETIC FIELD

[72] Inventors: Paul Höller, Oberhausen; Paul Scholten, Essen-Frintrop, both of Germany

[73] Assignee: Huttenwerk Oberhausen AG, Oberhausen, Germany

[22] Filed: Jan. 7, 1970

[21] Appl. No.: 1,275

Related U.S. Application Data

[63] Continuation-in-part of Ser. No. 775,665, Nov. 14, 1968, abandoned.

[30] Foreign Application Priority Data

Jan. 9, 1969 Germany .................. P 19 00 992.8

[52] U.S. Cl. .................................................. 324/37
[51] Int. Cl. .................................................. G01r 33/12
[58] Field of Search .................................. 324/37, 38

[56] References Cited

UNITED STATES PATENTS

| 2,764,733 | 9/1956 | De Forest | 324/38 |
| 2,979,655 | 4/1961 | De Forest | 324/37 X |
| 3,534,258 | 10/1970 | Förster | 324/37 |

OTHER PUBLICATIONS

Lorenzi et al., Application of A. C. Bias To Magnetic Tape Method of Inspecting Billets; Material Evaluation; Jan. 1968; Vol. XXVI, No. 1, pp. 13– 16.

Primary Examiner—Rudolph V. Rolinec
Assistant Examiner—R. J. Corcoran
Attorney—Karl F. Ross

[57] ABSTRACT

Method of detecting the location and extent of superficial faults, especially cracks, and for measuring the depths of such cracks in bars, billets, blooms, ingots, rods and tubes, especially of noncircular cross section. An electric current is passed axially through the elongated metallic body in one direction, and the magnetic flux of field (crossflux) generated by the passage of the electric current through the body is detected along the surface thereof. To avoid or reduce the effects of the edges of the noncircular body upon the detected magnetic field strength or flux and, therefore, to reduce the possibility that longitudinal cracks in the region of these edges will be undetected or poorly evaluated, the electric current passed axially through the bar is pulsed with the pulse shape being selected such that, in relation to the geometry of the bar, cracks in the surface in the region of the edges are detected. The pulsed current may derive from, say, a 50 or 60 Hz line source subjected to half-wave rectification; preferably pulse frequencies of 20 to 100 Hz are used. Periodically, or prior to each pulse, an erasing pulse is passed through the bar in the opposite direction to eliminate the residual magnetism from the previous scanning pulse or pulses. Hence the magnetization pulse is applied only to a nonmagnetized or previously demagnetized body.

5 Claims, 5 Drawing Figures